July 1, 1958 L. E. DRUMMOND ET AL 2,840,915
APPARATUS FOR DETERMINING THE PERCENTAGE OF
RED CELLS IN A BLOOD SPECIMEN
Filed March 23, 1954 2 Sheets-Sheet 1
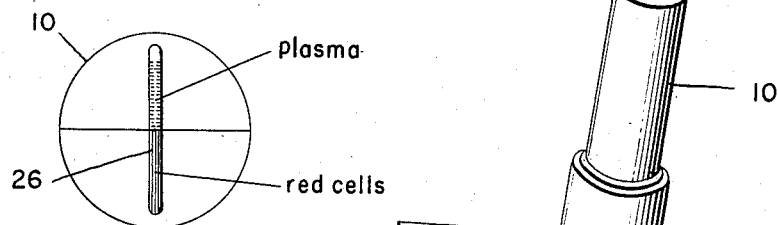
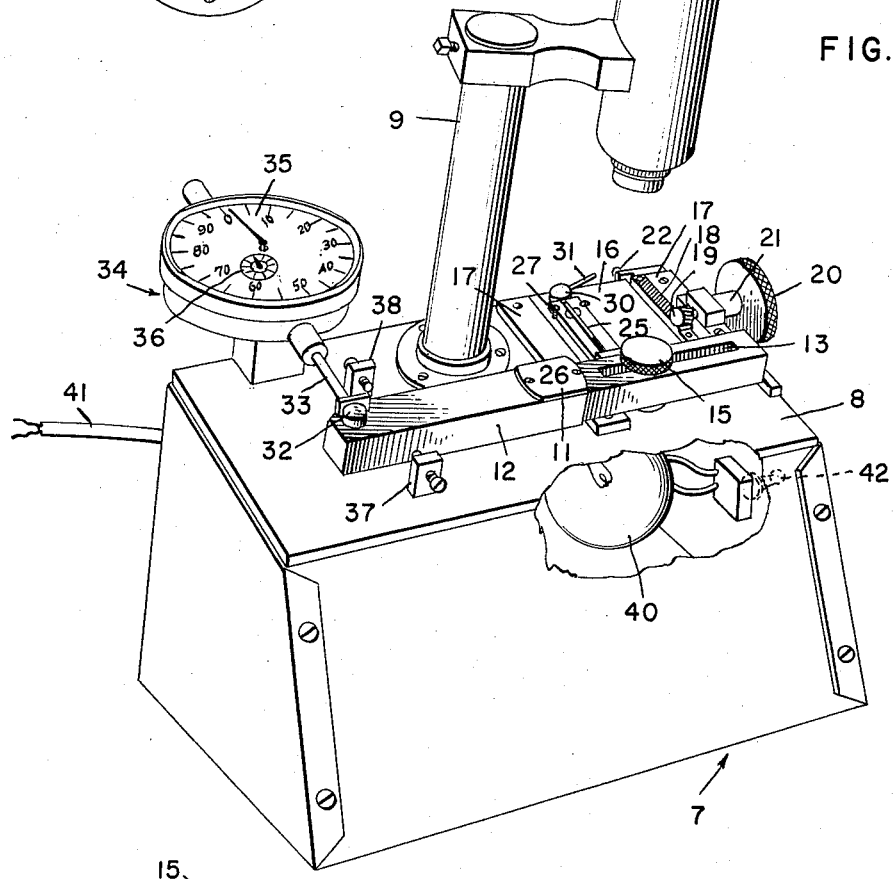
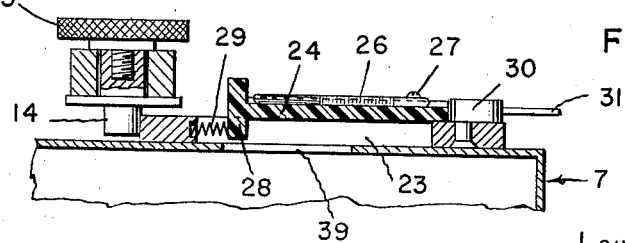
Inventors
Louis E. Drummond
Edward L. Drummond
Robert J. Drummond July 1, 1958
L. E. DRUMMOND ET AL
2,840,915
APPARATUS FOR DETERMINING THE PERCENTAGE OF
RED CELLS IN A BLOOD SPECIMEN
Filed March 23, 1954
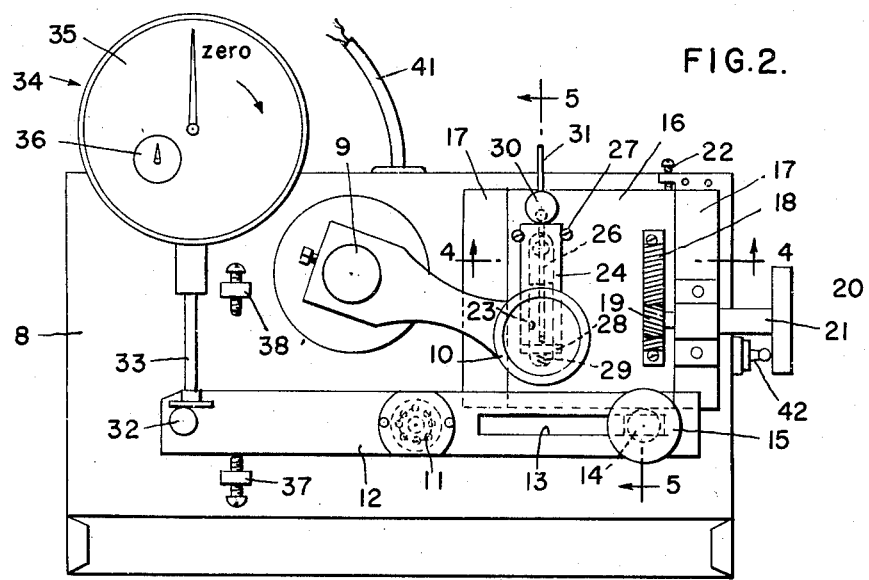
FIG.2.
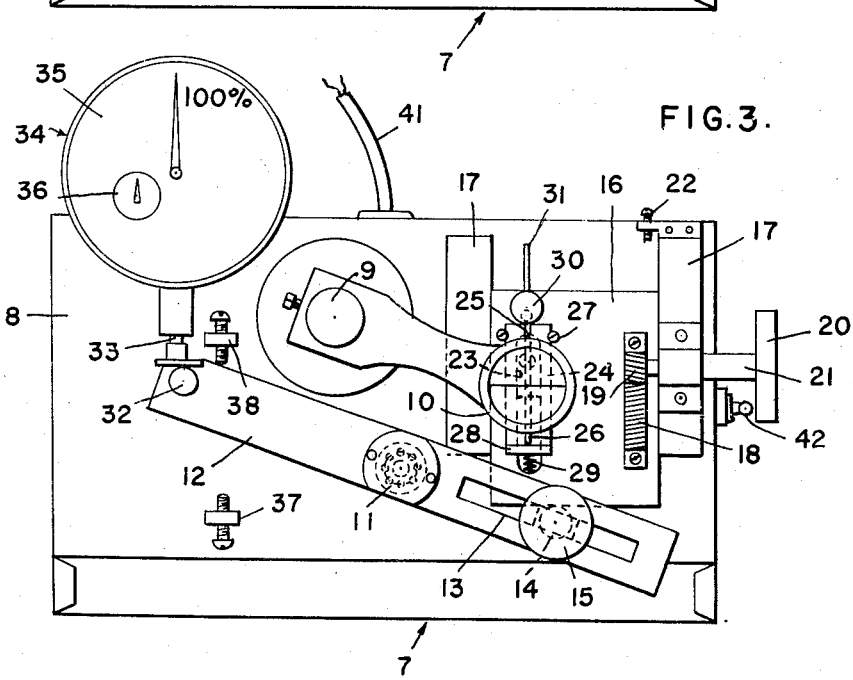
FIG.3.
FIG.4.
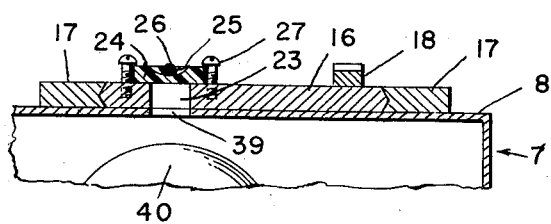
Inventors
Louis E. Drummond
Edward L. Drummond
Robert J. Drummond
Bernard F. Larsely
ATTY.

United States Patent Office

2,840,915
Patented July 1, 1958

2,840,915

APPARATUS FOR DETERMINING THE PERCENTAGE OF RED CELLS IN A BLOOD SPECIMEN

Louis E. Drummond and Edward L. Drummond, Havertown, and Robert J. Drummond, Drexel Hill, Pa.

Application March 23, 1954, Serial No. 418,034

6 Claims. (Cl. 33—125)

This invention relates to a capillary hematocrit reader and more particularly to an apparatus for determining the percentage of red cells present in a specimen of blood.

In analyzing a blood specimen to determine the percentage of red cells present, it is the practice, at present, to collect the blood in a capillary tube, which tube is then centrifuged to separate the red cells from the plasma. The height of the column of the whole specimen and the height of the column of packed red cells are then measured, a cathetometer being used where a high degree of accuracy is desired. Dividing the height of the red cells by the height of the whole column gives the percentage of red cells present. This method is both time-consuming and subject to human error at various phases of the operation.

It is an object of this invention, therefore, to provide an apparatus for rapidly and accurately determining the percentage of red cells present in a blood specimen without measuring the height of the columns of the specimen and the red cells and without mathematical computation.

Another object is to provide a device of the character described which is adaptable for use in analyzing blood specimens of varying quantities.

A further object is to provide a capillary hematocrit reader of the character described having indicating means readable directly in percentages.

The invention, together with its objects and advantages, will be best understood by reading the following detailed description with reference to the accompanying drawings in which is illustrated a presently preferred embodiment of the invention, and wherein:

Fig. 1 is a perspective view of the present invention, a part being broken away to disclose details of structure;

Fig. 2 is a top plan view of the same;

Fig. 3 is a top plan view showing the position of the rocking bar at the completion of a cycle of operation;

Fig. 4 is a fragmentary sectional view taken along the line 4—4 of Fig. 2, looking in the direction of the arrows;

Fig. 5 is a sectional view taken along the line 5—5 of Fig. 2, looking in the direction of the arrows, and Fig. 6 is a view of a centrifuged capillary tube as seen through the telescope of the present device.

In general, the device of the present invention comprises a bar pivoted at the midpoint and having a sliding pin movable through substantially one-half of the bar and a pin fixedly secured to the terminus remote from the sliding pin. The fixed pin bears against and operates a standard dial indicator or gauge. The sliding pin is contacted by the lower edge of a sliding plate on which a capillary tube holding a blood specimen is mounted. Under urging of the plate, the bar rotates about its pivot to actuate the gauge. A microscope is employed for observing the capillary tube. The positioning of the sliding pin is determined by the height of the whole blood specimen column, the horizontal cross hair of the microscope being the reference point for height. There is established by this positioning of the sliding pin a ratio between the movement of the sliding plate and the dial indicator actuating arm. When the sliding pin and fixed pin are equidistant from the pivot point, this ratio is one to one. When the sliding pin is halfway between the pivot point and end of the bar, this ratio becomes one-half to one, etc.

Referring now in greater detail to the drawings, the device of the present invention comprises a support casing 7 including a canted top 8 on which is mounted vertical supporting post 9 on which a part of a microscope unit 10 is detachably sleeved. Extending lengthwise of top 8 and pivoted thereon at its midpoint by a ball bearing pivot 11 is a rocking bar 12. Bar 12 is slotted between pivot 11 and one terminus, as indicated at 13, to receive a sliding variable radius pin 14 having a knurled adjusting knob 15, the specific function of which pin will be hereinafter more specifically set out. Cooperating with pin 14 for the purpose of rotating rocking bar 12 about its pivot point is a sliding stage 16 movable between side guides 17 which are secured to top 8. To effect movement of sliding stage 16, a rack 18 is mounted thereon and engaged by pinion 19 mounted on one end of a transverse shaft 20. To the free terminus of shaft 20 is affixed a knurled knob 21 for rotating pinion 19. Movement of sliding stage 16 in a direction opposite to rocking bar 12 is limited by an adjustable stop 22.

As shown to advantage in Figs. 4 and 5, a portion of sliding stage 16 is cut out directly under the eyepiece of microscope 10 to provide an opening 23 over which a specimen holder 24 is placed. Holder 24 is preferably made of a transparent plastic and is provided with a V-shape groove 25 in which capillary tube 26 is placed. Screws 27 secured to sliding stage 16 function as lateral guides for holder 24. One end of specimen holder 24 is provided with a flange or abutment 28, between which flange and that portion of stage 16 adjacent opening 23 a coil spring 29 is interposed for tensioning holder 24 in a direction away from rocking bar 12. Adjacent the opposite terminal of holder 24 is a cam 30 rotatably mounted in sliding stage 16 and having a wire operating handle 31. Cam 30 functions to position specimen holder 24 at the point where the horizontal cross hair of microscope 10 intersects the bottom of the column of blood in capillary tube 26 when sliding stage 16 is in the zero position shown in Fig. 2.

The opposite end of rocking bar 12 is equipped with a lug 32 which abuts against the plunger 33 of a conventional gauge 34 mounted on top 8. For purposes of illustration there is shown a Federal gauge, model D815, which comprises 1,000 divisions or increments and includes a large dial 35 divided into 100 divisions, and a small dial 36 for indicating the number of revolutions of dial 35 from one to ten. Rocking bar 12 strikes an adjustable zero stop 37 when the instrument is in the zero position shown in Fig. 2 and abuts an upper limit stop 38 when plunger 33 is fully depressed to indicate 100%. Since gauge 34 is graduated into a thousand divisions, it will give readings accurate to 0.1%.

Top 8 of casing 7 is provided with an opening 39 subjacent opening 23 of sliding stage 16 to permit electric light 40 situated within the casing to illuminate capillary tube 26. An electric cable 41 connects light 40 to any suitable power source. Light 40 is actuated by a conventional switch 42.

In operation, centrifuged capillary tube 26 is placed in V-shape groove 25 of specimen holder 24 and variable radius pin 14 is moved in slotted bar 12 to the extreme right away from pivot 11. Sliding stage 16 is run by means of rack 18 and pinion 19 to its upper limit where it strikes stop 22. At this time the reading of indicator 34 is zero. The operator then views the capillary tube through microscope 10, adjusting the latter until the vertical cross hair parallels the tube. Cam 30 is rotated by handle 31 and in cooperation with spring 29 moves specimen holder 24 toward or away from rocking bar 12 until the horizontal cross hair intersects the bottom of the specimen in capillary tube 26. The instrument is at this time in the position shown in Fig. 2.

Sliding stage 16 is then actuated by rotation of hand knob 20 until the horizontal cross hair of microscope 10 intersects the top of the meniscus of the plasma. Variable radius pin 14 is slid in groove 13 to the left as far as it will go. The gauge reading is 100% and the instrument assumes the position shown in Fig. 3. At this point the instrument has been adapted to the height of the blood specimen in the capillary tube. As the final step in the operation, stage 16 is moved until the horizontal cross hair intersects the top of the red cell column in tube 26. The dial reading represents the percentage of red cells contained in the specimen of blood. With indicator 34 illustrated in the drawings, small dial 36 records the number of complete revolutions of the pointer of large dial 35. Since the large dial records from one to one hundred, this means that accuracy may be obtained to one-tenth percent. For example, if the pointer of small dial 36 is between four and five, and the pointer of large dial 35 points to 58, the percentage reading is 45.8 percent.

While the device of the present invention has been described and illustrated as relating to the analysis of blood specimens, it is to be understood that the principle here employed is adaptable to many other applications, wherein the determination of percentage is required. Only such limitations are to be imposed thereon as may reasonably come within the scope of the appended claims.

What we claim is:

1. Apparatus for determining the percentage of red cells in a blood specimen including a movable stage adapted for the reception of a centrifuged capillary tube of blood, means for guiding the stage in straight line movement, a hairline sight positioned above the tube, guide means on the stage for moving the tube of blood independently of the stage and in the same line of direction as the stage to bring a terminal of the red blood column into a position substantially uniplanar with the hairline, and mechanism comprising a gauge and interconnected parts, operable in a predetermined sequence to visualize the percentage reading of the red cells in said tube.

2. Apparatus for determining the percentage of red cells in a blood specimen including a movable stage adapted for the reception of a centrifuged capillary tube of blood, means for guiding the stage in straight line movement, a hairline sight above the tube, guide means on the stage for moving the tube of blood independently of the stage and in the same line of direction as the stage to bring a terminal of the red blood column into a position substantially uniplanar with the hairline, and mechanism comprising a gauge, a pivoted connecting bar engageable with said gauge and movable stage, said bar being rotatable about its pivot under urging of said stage to actuate the gauge and visualize the percentage reading of the red cells in said tube.

3. Apparatus for determining the percentage of red cells in a blood specimen including a movable stage adapted for the reception of a centrifuged capillary tube of blood, a hairline sight above the tube, the tube being positioned to bring a terminal of the red blood column into a position substantially uniplanar with the hairline, and mechanism comprising a gauge, a pivoted connecting bar engageable with said gauge and movable stage, said bar being rotatable about its pivot under urging of said stage to actuate the gauge and visualize the percentage reading of the red cells in said tube, the pivoted bar carrying a sliding element movable through a portion of the bar length and engaged by said movable stage, for calibrating the gauge to the height of the blood specimen.

4. Apparatus for determining the percentage of red cells in a blood specimen including a movable stage adapted for the reception of a centrifuged capillary tube of blood, means for guiding the stage in straight line movement, a hairline sight above the tube, guide means on the stage for moving the tube of blood independently of the stage and in the same line of direction as the stage to bring a terminal of the red blood column into a position substantially uniplanar with the hairline, and mechanism comprising a gauge and a connecting bar pivoted intermediate its length, the terminals of which are engageable with said gauge and movable stage, said bar being rotatable about its pivot under urging of said stage to actuate the gauge and visualize the percentage reading of the red cells in said tube.

5. Apparatus for determining the percentage of red cells in a blood specimen including a movable stage adapted for the reception of a centrifuged capillary tube of blood, a hairline sight above the tube, the tube being positioned to bring a terminal of the red blood column into a position substantially uniplanar with the hairline, and mechanism comprising a gauge and a connecting bar pivoted intermediate its length, the terminals of which are engageable with said gauge and movable stage, the pivoted bar carrying a pin slidable through a portion of the bar length and engaged by said movable stage for calibrating the gauge to the height of the blood specimen, said connecting bar being rotatable about its pivot under urging of said movable stage engaged with one terminal thereof, to actuate said gauge operatively engaged with the other terminal of said bar and visualize the percentage reading of the red cells in said tube.

6. Apparatus for determining the percentage of red cells in a blood specimen including a movable stage, a specimen holder carried by said stage and adapted for the reception of a centrifuged capillary tube of blood, means for guiding the stage in straight line movement, a hairline sight above the tube, guide means on the stage engaged with said specimen holder for moving the tube of blood independently of the stage and in the same line of direction as the stage to bring a terminal of the red blood column into a position substantially uniplanar with the hairline, and mechanism comprising a gauge and a pivoted connecting bar engageable with said gauge and movable stage, said bar being rotatable about its pivot under urging of said stage to actuate the gauge and visualize the percentage reading of the red cells in said tube.

References Cited in the file of this patent

UNITED STATES PATENTS

| 581,472 | Shaver | Apr. 27, 1897 |
| 1,323,267 | Hanson | Dec. 2, 1919 |
| 1,424,941 | Pirwitz | Aug. 8, 1922 |
| 1,467,403 | Toomey | Sept. 11, 1923 |
| 1,643,426 | Sutherland | Sept. 27, 1927 |
| 2,424,619 | Keepers | July 29, 1947 |

FOREIGN PATENTS

| 338,186 | Great Britain | Nov. 10, 1930 |